Patented Jan. 14, 1941

2,228,365

UNITED STATES PATENT OFFICE 2,228,365

PROCESS OF PRODUCING VINYL ESTERS

Walter Reppe and Werner Wolff, Ludwigshafen-on-the-Rhine, Germany, assignors, by mesne assignments, to General Aniline & Film Corporation, New York, N. Y., a corporation of Delaware No Drawing. Application August 2, 1939, Serial No. 287,928. In Germany August 13, 1938

1 Claim. (Cl. 260—97.5)

The present invention relates to a process of producing vinyl esters.

In U. S. Patent 2,066,075, one of the present inventors has described a process for the preparation of vinyl esters from acetylene and fatty acids containing at least 5 carbon atoms according to which the acetylene is reacted with the fatty acids in the liquid phase and in the presence of zinc or cadmium salts of carboxylic acids as a catalyst, preferably under increased pressure.

We have now found that vinyl esters can also be prepared from the mixtures of unsaturated fatty acids and resin acids known as tall oil by allowing acetylene to act on tall oil in the liquid phase in the presence of zinc or cadmium salts of carboxylic acids, and that the tall oil vinyl esters thus obtained have eminently valuable properties.

It is surprising that the tall oil can be converted into vinyl esters in this way because it is very non-uniform and usually has a high content of impurities, in particular sulphur compounds such as mercaptans and thioethers, and heavy metal salts, especially iron salts, and also water which are known frequently to act as catalyst poisons. Contrary to expectation, however, these impurities are not injurious in the treatment with acetylene. On the contrary tall oil may be converted into vinyl ester especially simply, namely by treatment with acetylene at atmospheric pressure at from about 180° to 200° centigrade. Colophony and linseed oil fatty acids, which are known to be present predominantly in tall oil, cannot be converted or can only be converted with great difficulty into vinyl esters under the same conditions on a technical scale.

By the treatment of tall oil according to this invention, its acid value disappears almost completely.

The vinyl esters obtained may be polymerised in the manner known for vinyl esters, either alone or in admixture with other polymerisable substances. By polymerisation in admixture with vinyl ethers having a plurality of vinyl groups in the molecule, products similar to factice or linoxyn are obtained. The monomeric tall oil vinyl esters also have drying properties, i. e. in thin layers they dry to solid films. Consequently they may be used as drying oils in the same way as linseed oil or wood oil. In the same way as the latter, the vinyl esters of tall oil may also be converted by blowing with air into masses similar to linoxyn or into stand oils by simple heating while excluding oxygen.

Contrasted with the glycerine esters of tall oil which also have drying properties, and with the vinyl or glycerine esters of linseed oil the vinyl esters of tall oils have a better drying capacity in the air and increased stability to water and weather influences. Further they have also an excellent compatibility with other lacquer raw materials, as for example nitrocellulose, chlororubber, natural and synthetic resins, in particular alkyd resins, and also with other drying oils.

The vinyl esters of tall oil, either in the monomeric or partly or wholly polymerised form, and also the said interpolymerisation products, are eminently suitable as binding agents for floor covering masses and as additions to rubber instead of factice.

The tall oil vinyl esters obtained directly by the treatment with acetylene may be used without further purification. By distillation in high vacuo they may also be freed from the zinc and cadmium salts serving as catalysts and also from impurities and thus obtained as specially pale oils.

These specially pale oils have a smaller drying power than the crude products. The crude esters may also be bleached by the bleaching processes usual in the oil industry, as for example by means of active carbon or earths.

The following examples will further illustrate how this invention may be carried out in practice, but the invention is not restricted to these examples. The parts are by weight.

Example 1

Crude Swedish tall oil is dehydrated by heating to about 110° centigrade. During further heating, 1 per cent of zinc oxide is gradually added which forms the corresponding zinc salts of the tall oil carboxylic acids and the whole is then treated at between 170° and 225° centigrade in a stirring vessel or a cylinder filled with Raschig rings with acetylene at atmospheric pressure, a moderate increase in temperature thus taking place. The cource of the reaction is preferably followed by determination of the acid value which towards the end of the reaction amounts to about 10. A brown oil is obtained which may be used as a drying oil in lacquers.

For example by triturating 1 part of tall oil vinyl ester with 2 parts of a paste of zinc white and linseed oil in a funnel mill after adding driers and diluting with lacquer benzine until the product is capable of being painted, there is obtained a coating colour which goes on well and which dries rapidly.

The crude or pure ester, after the addition of driers and if desired after suitable dilution, may also be used for impregnating fabrics and papers to render them waterproof.

Putty-like masses are obtained for example by kneading 8 parts of tall oil vinyl ester, 7 parts of lubricating oil and 85 parts of ground chalk. By treating the tall oil vinyl ester with sulphur or sulphur monochloride, products similar to factice are obtained.

A rapidly drying oil lacquer which is very fast to weather is obtained by boiling 1 part of oil-soluble alkyl-phenol-formaldehyde resin with 3 parts of tall oil vinyl ester for from 10 to 12 minutes at 240° centigrade.

The tall oil vinyl ester may also be converted into an oxyn by the processes usual for the preparation of linoxyn, for example similarly to the Tücher or Taylor process. There may be obtained therefrom an excellent floor covering similar to linoleum by working up 40 parts thereof, 40 parts of wood meal and 20 parts of pigment in the manner usual in the linoleum industry.

The tall oil vinyl ester oxyn may also be used together with other known linoleum binding agents, as for example linoxyn, polyvinyl compounds and nitrocellulose.

A polymerisation product also capable of use with advantage as a linoleum cement is obtained for example by heating a mixture of 12.7 parts of tall oil vinyl ester, 4.7 parts of diethylene glycol divinyl ether, 46 parts of vinyl methyl ether and 28 parts of vinyl ethyl ether in the presence of 8.7 parts of a synthetic resin from equimolecular amounts of maleic anhydride and colophony which has been esterified with glycerine, for about 15 hours at 100° centigrade in the presence of air. 25 parts of this polymerisation product, 50 parts of wood meal, 12.5 parts of light spar and 12.5 parts of iron oxide red, when worked up by the methods usual in the linoleum industry, and if desired calendered on to jute, yield an excellent floor covering.

Example 2

3 per cent of zinc oxide are dissolved in tall oil which has been freed by distillation from part of its resin content. An equal weight of toluene is added to this solution and the whole heated in an autoclave at from 180° to 200° centigrade under a pressure of from 15 to 20 atmospheres with a mixture of 2 parts of nitrogen and 1 part of acetylene, while subsequently pressing in acetylene until the amount of acetylene theoretically necessary for the formation of the vinyl ester has been absorbed. After distilling off the diluent, an oil remains which dries rapidly to solid films in thin layers.

What we claim is:

A composition of matter comprising a reaction product of a tall oil with acetylene substantially constituting a mixture of vinyl esters of the carboxylic acids contained in the tall oil.

WALTER REPPE.
WERNER WOLFF.